(12) United States Patent
Pavlyushchik

(10) Patent No.: US 7,555,621 B1
(45) Date of Patent: Jun. 30, 2009

(54) DISK ACCESS ANTIBLOCKING SYSTEM AND METHOD

(75) Inventor: Mikhail A. Pavlyushchik, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 0 days.

(21) Appl. No.: 11/461,526

(22) Filed: Aug. 1, 2006

(51) Int. Cl.
*G06F 12/00* (2006.01)

(52) U.S. Cl. ...................................... 711/162

(58) Field of Classification Search ........................ None
See application file for complete search history.

(56) References Cited

U.S. PATENT DOCUMENTS

| | | | | |
|---|---|---|---|---|
| 5,524,235 A | * | 6/1996 | Larson et al. | 711/151 |
| 6,145,028 A | * | 11/2000 | Shank et al. | 710/31 |
| 6,430,194 B1 | * | 8/2002 | Ilyadis et al. | 370/462 |
| 6,505,260 B2 | * | 1/2003 | Chin et al. | 710/41 |
| 6,799,254 B2 | * | 9/2004 | Oldfield et al. | 711/151 |
| 6,950,912 B2 | * | 9/2005 | Oldfield et al. | 711/151 |
| 7,185,155 B2 | * | 2/2007 | Sechrest et al. | 711/158 |
| 2004/0199917 A1 | * | 10/2004 | Ofer et al. | 718/100 |

* cited by examiner

*Primary Examiner*—Brian R Peugh
(74) *Attorney, Agent, or Firm*—Bardmesser Law Group

(57) ABSTRACT

A system, method and computer program product that manage storage device load, including (a) classifying processes that access a storage device as high priority and low priority; (b) monitoring access activity to the storage device by the high priority processes; and (c) regulating the access activity of the low priority processes based on the access activity of the high priority processes. A counter can be used to monitor the access activity of the high priority processes, so that a request to the storage device increases the counter and a response from the storage device decreases the counter, and access to the storage device for the low priority processes when the counter is zero. The low priority processes can be backup processes, security system processes, anti-virus processes, compression processes, archive systems, and applications that monitor storage device access.

21 Claims, 6 Drawing Sheets

DISK ACCESS ANTIBLOCKING SYSTEM AND METHOD

BACKGROUND OF THE INVENTION

1. Field of the Invention

The present invention is related to scheduling storage device access, and, more particularly, to preventing a program that normally runs in the background from monopolizing disk access.

2. Description of the Related Art

Hardware resource management is an important issue in modern IT development. Commonly, an operating system is responsible for scheduling and allocating various hardware resources of a desktop computer or a server. For example, the operating system schedules use the CPU between various processes and threads running at a given time. Such scheduling can occur, for example, as a result of allocating each thread an equal time "slice" of the CPU or can have a more complex priority mechanism, when some processes/threads are allotted a higher percentage of the CPU time, while others receive a lower percentage.

Memory allocation is an area where the operating system determines the parameters of resource allocation. Thus, the operating system schedules use of memory and allocates memory, both physical and virtual, to various processes and threads, i.e., lightweight processes, running on the computer.

One of the problematic issues in the resource allocation relates to the hard disk drive, particularly for those applications that are intended to run in the background, such as backup systems, security systems, anti-virus systems, archive systems, compression systems, etc. A good example of such an application is an anti-virus application which sequentially checks all the files on the hard drive for viruses. Today, many desktop computers have hard drives with thousands of files. Many of these are relatively small in size, such as those found in the Temporary Internet Files folder of Internet Explorer, or similar types of files of other browsers, files such as GIFs, JPEGs, saved web pages, etc. Unless the user routinely purges such files, the number of files that the anti-virus application needs to go through and check for virus presence can easily reach 200,000-400,000 or even more.

However, due to the nature of the hardware, only one application at any given time can send a request for access to the disk drive. Therefore, even though the anti-virus application itself might consume a relatively small share of the CPU time and a small share of the available memory, the constant disk access requests issued by the anti-virus application mean that all the other processes on the computer experience a substantial slow down. Many users find it annoying and irritating and frequently stop the anti-virus application, preferring instead to work on their "useful" applications, whatever they might be, such as Microsoft Word, web browsing, etc.

Accordingly, there is a need in the art for a system and method that permit disk use-intensive applications in the background, without substantial slowing down other applications running on the computer.

SUMMARY OF THE INVENTION

Accordingly, the present invention is related to a system and method for preventing disk access monopolization by a low priority or background process that substantially obviates one or more of the disadvantages of the related art.

In one aspect of the invention, there is provided a system, method and computer program product that manage the storage device load, including (a) classifying processes that access storage device as high priority and low priority processes; (b) monitoring access activity to the storage device by the high priority processes; and (c) regulating the access activity of the low priority processes based on the access activity of the high priority processes.

A counter can be used to monitor the access activity of the high priority processes, such that a request to the storage device increases the counter and a response from the storage device decreases the counter, and accesses the storage device for the low priority processes when the counter is zero. The low priority processes can be backup system, security processes, anti-virus, archive and compression processes, and the applications that monitor the storage device access.

If the storage device activity of the high priority is high, the access activity of the low priority processes can be rerouted to another storage device, or can be suspended until the access activity of the high priority process drops. The access requests of the storage device of the high priority processes can be tracked using a system call interceptor. The system and method can keep track of access activity of the high priority processes over time and regulate the access activity of the low priority processes based on a fraction of the time when the high priority processes use the storage device.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1:
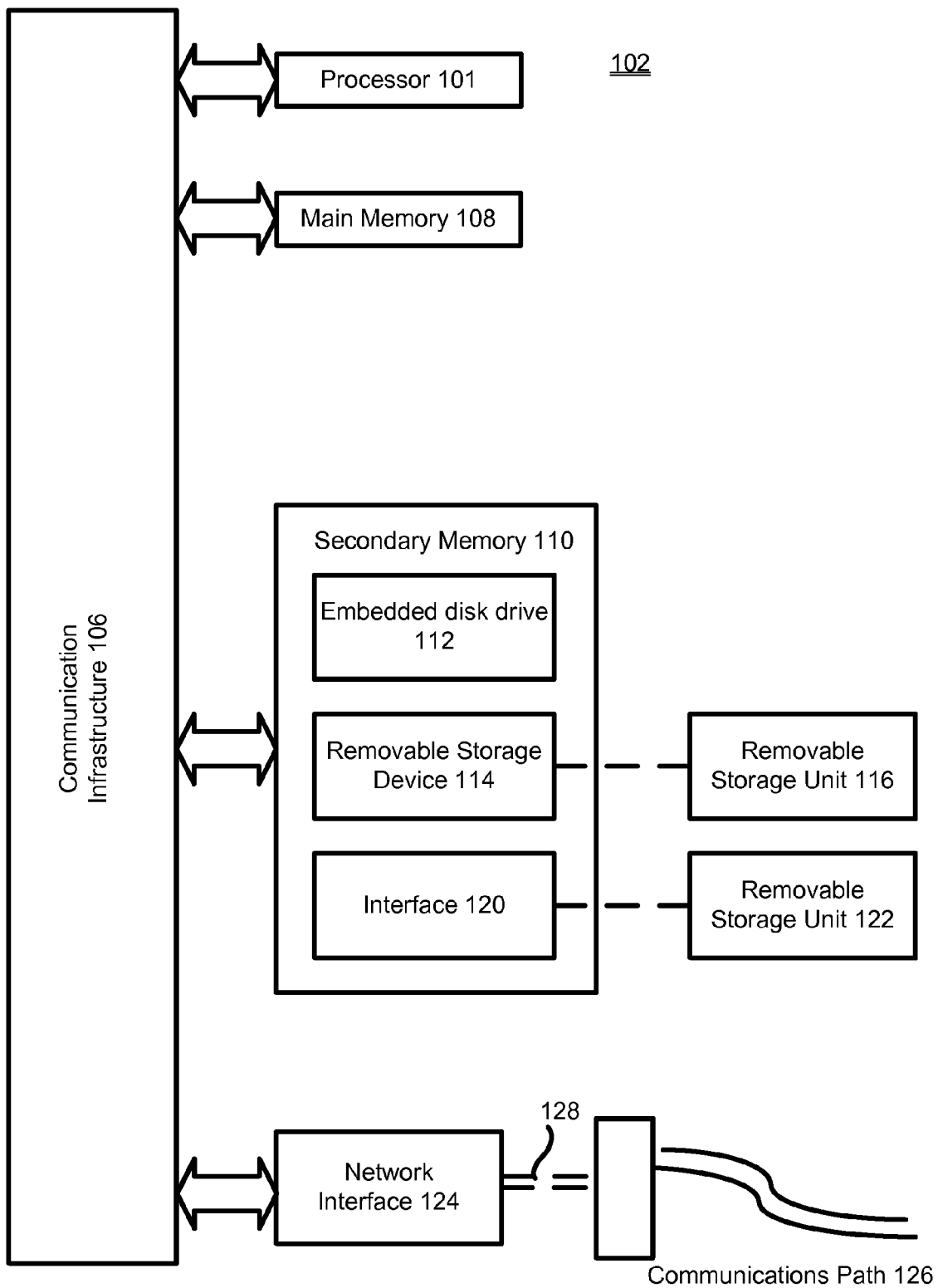
FIG. 1 illustrates an example of a computer system on which the invention may be implemented.

An example of the computing system 102 on which the present invention can be implemented is shown in FIG. 1. The computing system 102 includes one or more processors, such as processor 101. The processor 101 is connected to a communication infrastructure 106, such as a bus or network. Various software implementations are described in terms of this exemplary computer system. After reading this description, it will become apparent to a person skilled in the relevant art how to implement the invention using other computer systems and/or computer architectures.

The computing system 102 includes a main memory 108, preferably random access memory (RAM), and can also include a secondary memory 110. The secondary memory 110 may include, for example, an embedded disk drive 112 (e.g., a hard disk drive) and/or a removable storage device 114 (a magnetic tape drive, an optical disk drive, etc.). The removable storage device 114 reads from and/or writes to a removable storage unit 116 in a well-known manner. The removable storage unit 116 is represented by a magnetic tape, an optical disk, or other storage medium read by and written to removable storage device 114. As may be seen, the removable storage unit 116 can include a computer usable storage medium having stored therein computer software and/or data.

In alternative implementations, the secondary memory 110 includes other means for allowing computer programs or other instructions to be loaded into computing system 102. These include, for example, a removable storage unit 122 and an interface 120. It may include a removable memory chip (such as an EPROM, or PROM) and associated socket, or other removable storage units 122 and interfaces 120 which allow software and data to be transferred from the removable storage unit 122 to computing system 102.

The computing system 102 also includes one or more communications interfaces, such as network interface 124. The network interface 124 enables data transfer between the computing system 102 and the external devices. Examples of network interface 124 include a modem, a network interface (e.g., an Ethernet card), a communications port, a PCMCIA slot and card, etc. Software and data transferred via network interface 124 are run in the form of signals 128, electronic, electromagnetic, optical or other types, capable of being received by network interface 124. The signals 128 are provided to network interface 124 via a communications path (i.e., channel) 126. This channel 126 carries signals 128 and is implemented using a wire or cable, optical fibers, an RF link and other communications channels. In an embodiment of the invention, signals 128 comprise the data packets sent to processor 101. The information representing the processed packets can be sent in the form of signals 128 from the processor 101 through the communications path 126.

The terms "computer program medium" and "computer usable medium" generally refer to media such as removable storage units 116 and 122, a hard disk installed in embedded disk drive 112, and signals 128, which provide software to the computing system 102.

Computer programs are stored in the main memory 108 and/or secondary memory 110. Computer programs may also be received via network interface 124. When executed, the computer programs allow the computing system 102 to implement the present invention as discussed herein. In particular, the computer programs being executed enable the processor 101 to implement the present invention. Where the invention is implemented using software, the software may be stored in a computer program product and loaded into the computing system 102 using the removable storage device 114, hard drive 112 or communications interface 124.

Figure 2:
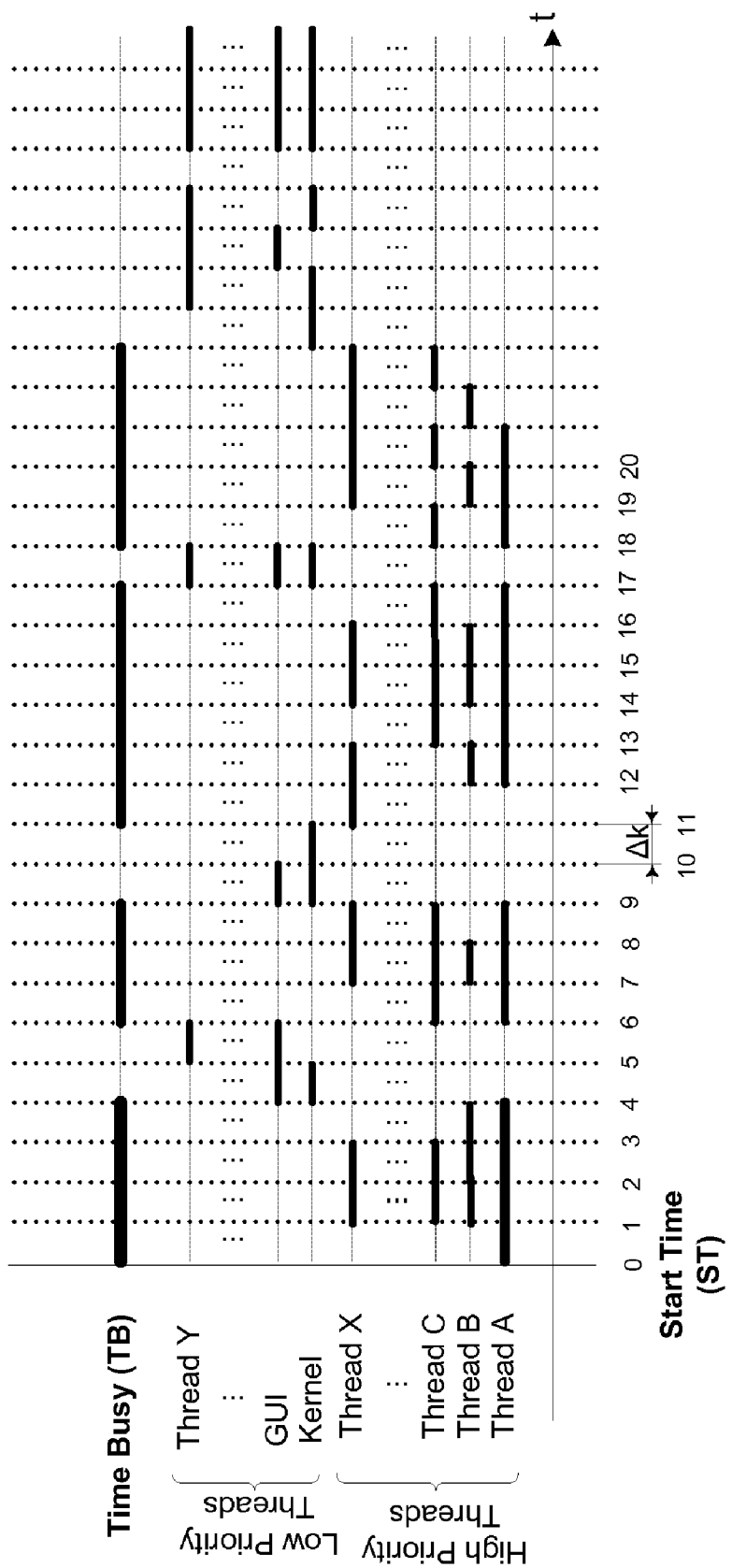
FIG. 2 illustrates a timeline of how the various threads and processes running on the computer can utilize the storage device.

FIG. 2 illustrates a timeline of various threads and processes running on the computer with the hard disk drive. As shown in FIG. 2, there are two types of threads: useful (high priority) threads, labeled thread A—thread X, and various low priority threads, such as threads relating to the antivirus product, labeled "GUI," "kernel," and "thread Y." Time Busy (TB) is the time when the hard disk drive is being accessed by the high priority threads; if any of the useful threads is accesses the hard disk drive at a certain time, then the hard disk drive is considered as busy. Note that the low priority thread does not contribute to the hard disk drive Time Busy.

FIG. 2 indicates how to select which of the threads and processes that utilize the hard disk drive count for the purpose of calculating the load on the disk drive, and count for purposes of deciding whether or not the low priority application should access the disk storage device at that point.

With reference to FIG. 2, the granularity of time is $\Delta k$ (i.e., the time between the two system calls to the disk drive, or, more broadly, to any storage device), ST (Start Time) is the time the event monitor is launched, TB (Time Busy) is the time the disk system is responding to requests from high priority threads. Considering the first ten units of time, starting with zero, it is seen that the Time Busy (TB) is seven $\Delta k$ units out of ten. The load is calculated by comparing total time TT and Time Busy TB. For example, in FIG. 2, when TT is 20, TB is 15, in other words, TB/TT=75%. The load can be calculated for any arbitrary period, e.g., from 8 to 20, where TT=12, TB=9, and the load is $9/12$=75%.

Based on dynamic characteristics and trends or on predefined static parameters, the low priority application can decide, whether either of the disk load values is sufficiently low to resume its disk accessing operations. The load factor can be used to compare with a threshold value for planning the work of the low priority application. For example, if the threshold is 85, and the example above gives 75, then the low priority application can access the disk drive.

It should be remembered that the start time can be continuously reset, or moved forward, since otherwise the value of TB/TT loses its relevance over time. For example, if the TB/TT is calculated starting from T=0 in FIG. 2, and ending at T=12, then TB/TT is $8/12$=$2/3$. If the relevant time period is reset to start at T=5, then TB/TT=$4/7$. The proper choice of the time period for calculating TB/TT can be determined empirically.

Figure 3:
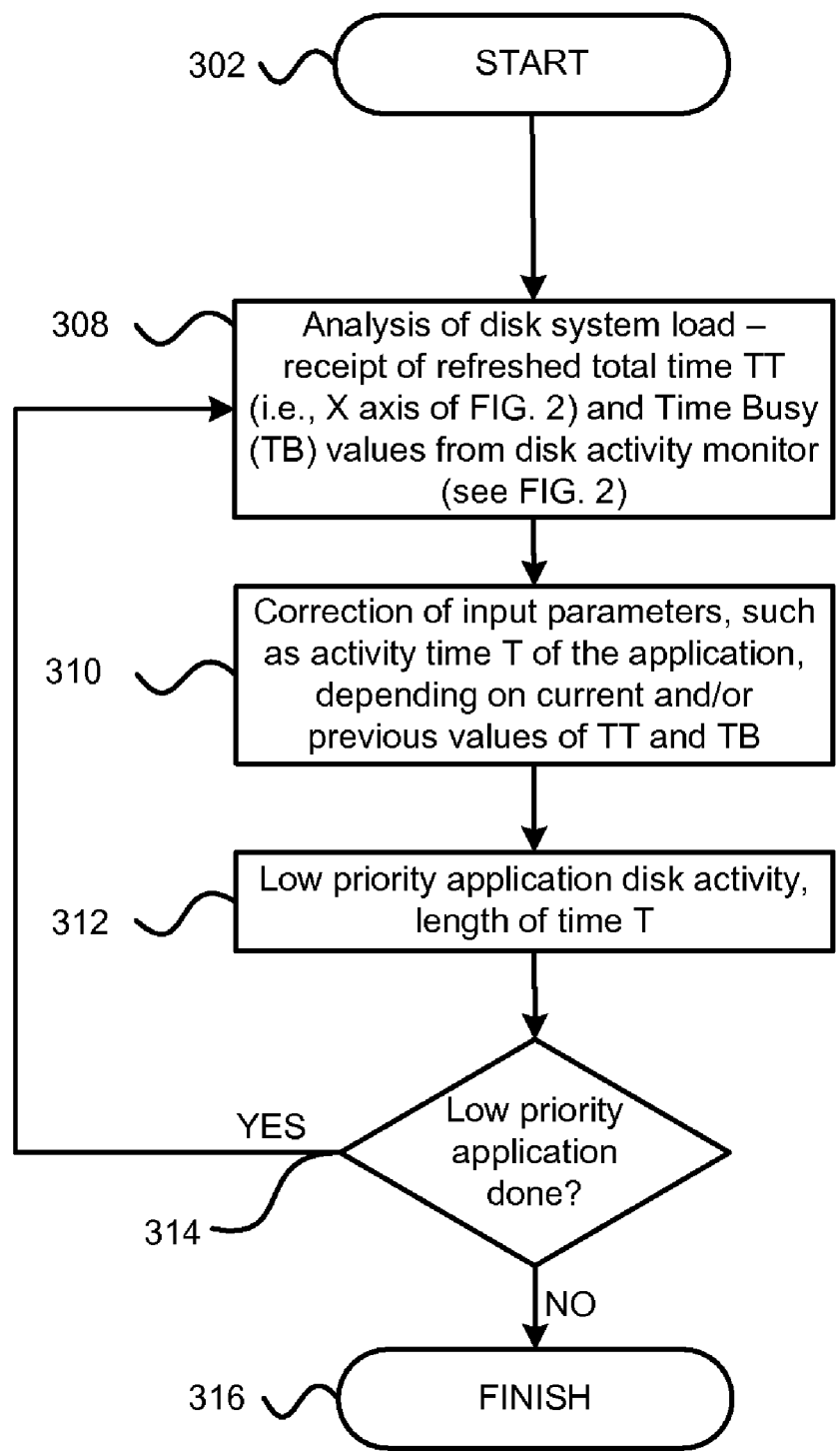
FIG. 3 illustrates the algorithm of how the low priority application decides to suspend its operations.

FIG. 3 illustrates the algorithm of how the low priority application (e.g., the anti-virus application) decides whether or not to suspend its own disk operations. As is shown in FIG. 3, after the start step 302, the anti-virus application analyzes the activity of monitored user applications as they relate to the disk drive, keeping track of at least two parameters, the Total Time (TT) and the Time Busy (TB) values, as discussed earlier with reference to FIG. 2. In step 310, the anti-virus application corrects its input parameters, depending on the settings, for example, it can consider only the last 10 time units, the last 20, etc. In step 312, the anti-virus application performs its tasks. In step 314, if the anti-virus application is finished with all the files that it needs to analyze, then the algorithm terminates in step 316. Otherwise, if there are files remaining to be analyzed for viruses, the algorithm returns to step 308.

Figures 4A, 4B:
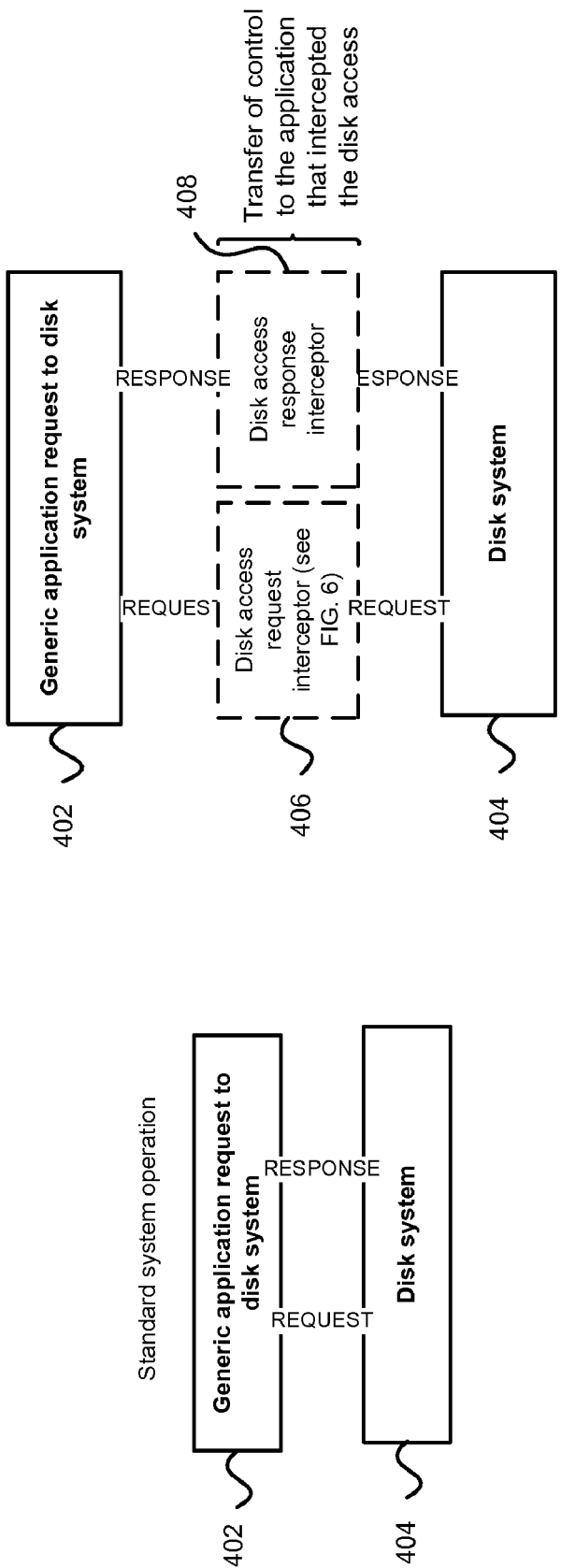
FIGS. 4A and 4B illustrate the location of the disk activity monitors in the overall disk access scheme.

FIGS. 4A-4B illustrates disk activity monitors located in the overall disk access scheme. As shown in FIG. 4A, an application 402, which can be either a user application, or an anti-virus application issues requests to the disk system 404 and receives responses from the disk system 404. In other words, the generic application issues read and write requests and gets responses from the disk drive, either the file requested, or some indication that the write has been completed. In FIG. 4B, disk monitors 406 and 408 have been inserted between the generic application 402 and the disk system 404. The monitor 406 intercepts the request from the generic application 402 to the disk system 404, and the monitor 408 intercepts responses from the disk system 404 to the application 402. Note that either or both of these can be used to estimate the Time Busy (TB) parameter.

Figure 5:
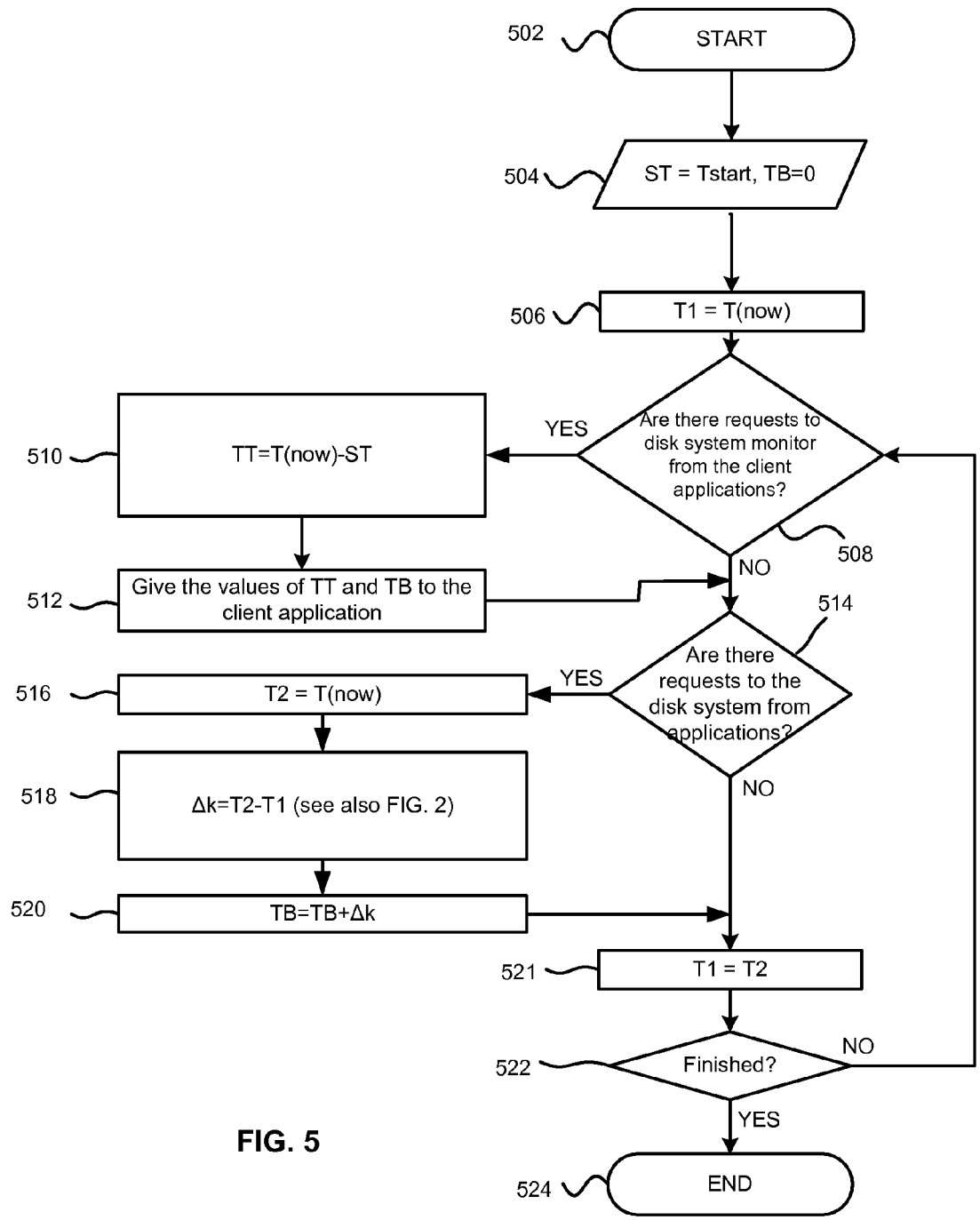
FIG. 5 illustrates an embodiment of the algorithm of the disk activity monitor.

FIG. 5 illustrates a possible embodiment of the algorithm of the disk activity monitor. As shown in FIG. 5, once the algorithm is started in step 502, various parameters are initialized in step 504, such as Start Time (ST), Time Busy (TB), the current time T(now), etc. In step 506, T1 is set to the current time. In step 508, the algorithm checks whether there are requests to the disk system monitor (see 406 and 408 in FIG. 4) from the user applications being monitored, in other words, threads A-X in FIG. 2. If there are such requests available, then, in step 510, the total time TT is calculated as the current time T(now) minus the Start Time (ST), i.e., the current time T(now) is the total time when the disk activity monitor has been active. In step 512, the values of Total Time (TT) and Time Busy (TB) are then returned to the anti-virus application. In step 514, the algorithm checks whether there are currently requests to the disk drive in progress, and if there are, then Time Busy (TB) is incremented, and T2 is set to the current time T(now) in step 516. The granularity of the measurement, $\Delta k$, is set to T2-T1 (step 518). In step 520, the Time Busy (TB) is incremented by $\Delta k$, the measurement granularity value. In 521, T1 is set to T2.

In step 514, if there are no disk access requests for disk read or disk write by the high priority process, the algorithm proceeds to step 521. In step 522, if the algorithm is finished, then the process terminates in step 524. Otherwise, the algorithm returns to step 508.

Figure 6:
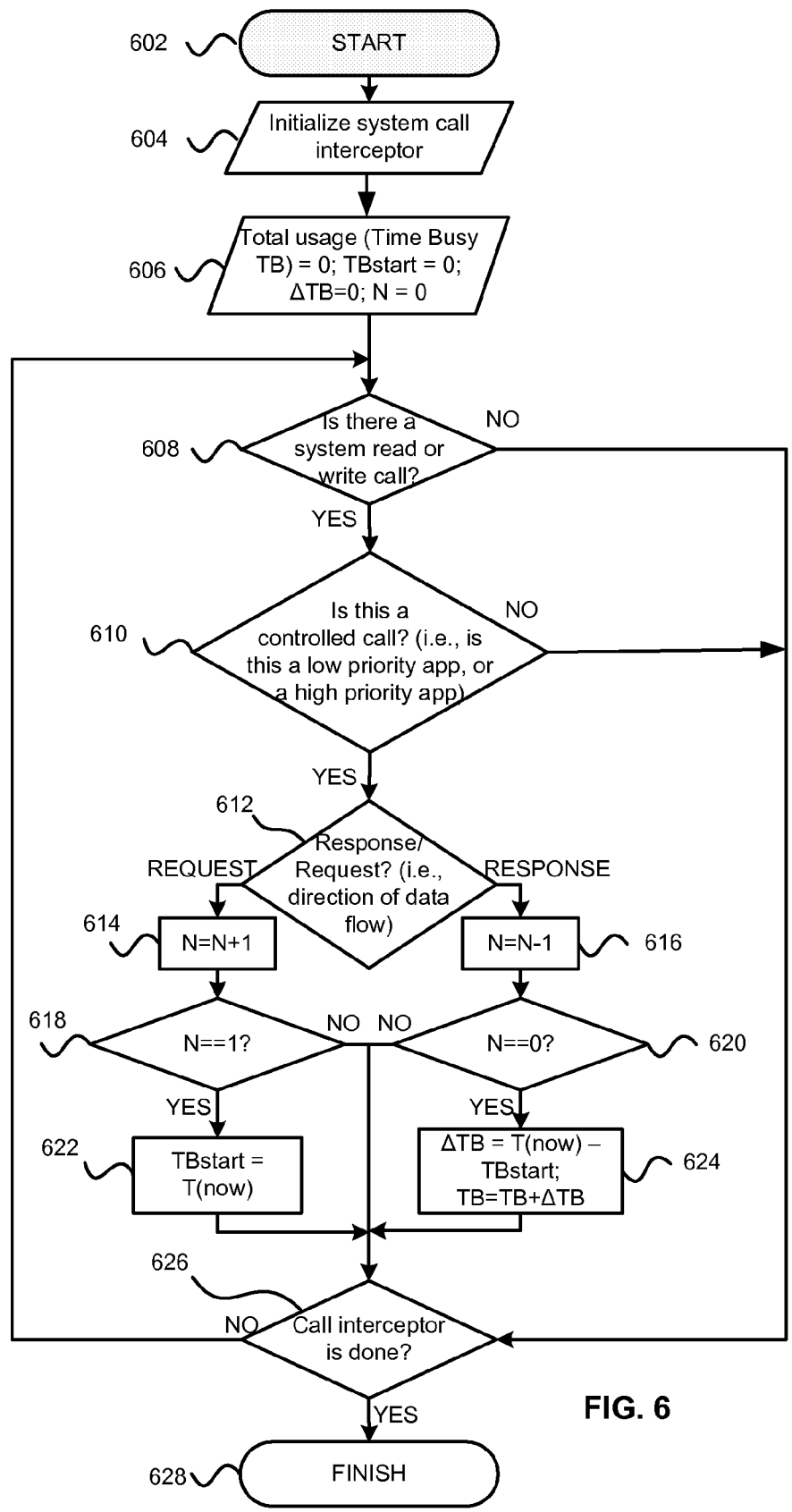
FIG. 6 illustrates an alternative embodiment of the disk load monitor of the present invention.

FIG. 6 illustrates an alternative embodiment of the disk load monitor of the present invention. As shown in FIG. 6, once the algorithm starts in step 602, the disk access request interceptors 406 and 408 are initialized and launched (step 604). In step 606, the parameters of the algorithm are initialized to zeros, e.g., the Time Busy (TB) is set to zero, the time of the first access request is set to zero, and the time between the first request and the last request and the counter N of the disk access request are also set to zero. In step 608, the algorithm checks if there is a read or write access. If not, then the algorithm proceeds to step 626. In step 626, if the disk access request interceptor is done, the algorithm finishes in step 628. Otherwise, the algorithm returns back to step 608.

In step 608, if there is a read or write access request, then in step 610, the algorithm checks whether this is a monitored access request, i.e., whether this is an access request from a high priority application, or this is an access request from a low priority process, such as the anti-virus application. If the request is not monitored, then the algorithm proceeds to step 626. If a monitored request is registered, then the algorithm proceeds to step 612, where it checks the response from the disk drive. If this is a response from the disk drive, then, in step 616, the counter N is decremented. In step 620, the algorithm checks if N is equal to zero. If N is not equal to zero, then the algorithm proceeds to step 626. In this case $\Delta TB$ is set to the current time minus Start Time (ST), and TB is decremented by $\Delta TB$. Then the algorithm proceeds to step 626. In step 612, if this is a request to the disk driver, then the counter is incremented in step 614. In step 618, the algorithm checks if the counter N is equal to 1. If N≠1, the algorithm proceeds to step 626. If N=1, the time of the first request read TB start is set to the current time T(now), in step 622. The algorithm then proceeds to step 626.

FIG. 6 represents a more sophisticated version of FIG. 5, where the system analyzes the load on the disk drive by looking at requests to the drive and responses from the drive. A read or write request to the drive adds "1" to the counter N and a response subtracts "1" from the counter N. Thus, as requests to the storage device are added to the queue, the counter N increases (and TB as well), and as the storage device responds, the counter decreases, until the counter N is eventually set to zero when all the requests have been serviced, and the lower-priority background process can access the drive.

It will also be appreciated that the approach described above can be applied to any storage device, not just to a disk drive. Also, multiple storage devices can be managed in this manner, optionally with a counter for each one, or, alternatively, having a uniform management scheme for several such devices. Each process can have its own counter, or several processes can have a single counter assigned to them.

Although the discussion above is related to the context of the anti-virus software as the one that is disk use-intensive, this invention is not limited to that particular application, but is also applicable to any other situation where one application, particularly those that can work in the background, require heavy disk access. Examples of these applications include backup systems, security systems, archive systems, compression systems, etc.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A method of local storage device load management, the method comprising:
   (a) classifying user software applications that access a local storage device as high priority and low priority, the high priority user software applications being those whose local storage device access is being monitored, and the low priority user software applications being those that can run in the background;
   (b) monitoring access activity to the local storage device by the high priority user software applications;
   (c) regulating access activity of the low priority user software applications based on the access activity of the high priority user software applications; and
   (d) using a counter to monitor the access activity of the high priority user software applications, such that a request to the local storage device increases the counter, and a response from the local storage device decreases the counter, and giving access to the local storage device for the low priority user software applications when the counter is zero.

2. The method of claim 1, wherein the low priority user software applications include any of backup system processes, security system processes, anti-virus processes, archive systems, compression processes, and monitoring the local storage device access.

3. The method of claim 1, wherein, if the access activity of the high priority user software applications is higher than a predetermined threshold, the access activity of the low priority user software applications is suspended until the access activity of the high priority user software applications becomes low.

4. The method of claim 1, further comprising intercepting the local storage device access requests of the high priority user software applications using a system call interceptor.

5. A method of local storage device load management, the method comprising:

(a) classifying user software applications that access a local storage device as high priority and low priority, the high priority user software applications being those whose local storage device access is being monitored, and the low priority user software applications being those that can run in the background;

(b) monitoring access activity to the local storage device by the high priority user software applications; and (c) regulating access activity of the low priority user software applications based on the access activity of the high priority user software applications, wherein, if the local storage device activity of the high priority user software applications is higher than a predetermined threshold, the access activity of the low priority user software applications is redirected to another local storage device.

6. A method of local storage device load management, the method comprising:

(a) classifying user software applications that access a local storage device as high priority and low priority, the high priority user software applications being those whose local storage device access is being monitored, and the low priority user software applications being those that can run in the background;

(b) monitoring access activity to the local storage device by the high priority user software applications;

(c) regulating access activity of the low priority user software applications based on the access activity of the high priority user software applications; and tracking access activity of the high priority user software applications over time, and regulating the access activity of the low priority user software applications based on a fraction of the time that the high priority user software applications are using the local storage device.

7. A method of determining local storage system activity, the method comprising:

tracking system calls to access a local storage device;

calculating a busy time fraction of high priority applications for a time period during which the system calls are tracked; and regulating the access to the local storage device by a low priority application based on the activity time fraction, wherein the access activity of the low priority application is suspended when the high priority applications access the storage above a predetermined busy time fraction, the high priority user applications being those whose local storage device access is being monitored, and the low priority user applications being those that run in the background.

8. The method of claim 7, wherein the time period runs from a time when monitoring of system calls is initiated up to a current time, and wherein the access activity of the low priority application is suspended when the high priority applications access the storage above a predetermined busy time fraction.

9. The method of claim 7, further comprising resetting the time period and recalculating the activity time fraction for the reset time period, for the regulating step.

10. The method of claim 7, wherein the time period runs from a time after monitoring of system calls is initiated up to a current time.

11. A system for local storage device load management comprising:

(a) means for classifying user software applications that access a local storage device as high priority and low priority, the high priority user software applications being those whose local storage device access is being monitored, and the low priority user software applications being those that can run in the background;

(b) a local storage device activity monitor that keeps track of disk requests by the high priority user software applications;

(c) means for suspending local storage device access activity of the low priority user software applications based on local storage device access activity of the high priority user software applications; and a counter used to monitor the local storage device access activity of the high priority user software applications, such that a request to the local storage device drive increases the counter, and a response from the local storage device decreases the counter, and wherein the low priority user software applications are given access to the local storage device when the counter is zero.

12. The system of claim 11, wherein the low priority user software applications include any of backup system user software applications, security system user software applications, anti-virus user software applications, archive systems, compression user software applications, and monitoring the local storage device access.

13. The system of claim 11, wherein, if the local storage device activity of the high priority user software applications is higher than a predetermined threshold, the local storage device access activity of the low priority user software applications is suspended.

14. The system of claim 11, further comprising a system call interceptor that intercepts local storage device access requests of the high priority use software applications.

15. A system for local storage device load management comprising:

(a) means for classifying user software applications that access a local storage device as high priority and low priority, the high priority user software applications being those whose local storage device access is being monitored, and the low priority user software applications being those that can run in the background;

(b) a local storage device activity monitor that keeps track of disk requests by the high priority user software applications; and (c) means for suspending local storage device access activity of the low priority user software applications based on local storage device access activity of the high priority user software applications, wherein, if the local storage device access activity of the high priority user software applications is higher than a predetermined threshold, the local storage device access activity of the low priority user software applications is redirected to another drive.

16. A system for local storage device load management comprising:

(a) means for classifying user software applications that access a local storage device as high priority and low priority, the high priority user software applications being those whose local storage device access is being monitored, and the low priority user software applications being those that can run in the background;

(b) a local storage device activity monitor that keeps track of disk requests by the high priority user software applications; and (c) means for suspending local storage device access activity of the low priority user software applications based on local storage device access activity of the high priority user software applications, wherein the local storage device activity monitor keeps track of local storage device access activity of the high priority user software applications over time, and regulates the local storage device access activity of the low priority user software applications based on a share of the time that the high priority user software applications are using the local storage device.

17. A system for local storage device load management comprising:
   (a) means for classifying user software applications that access a set of local storage devices as high priority and low priority, the high priority user software applications being those whose local storage device access is being monitored, and the low priority user software applications being those that can run in the background;
   (b) local storage device activity monitor that keeps track of local storage device access requests by the high priority user software applications for the set of local storage devices; and
   (c) means for suspending local storage device access activity of the low priority user software applications based on local storage device access activity of the high priority user software applications.

18. A method of local storage device load management, the method comprising:
   (a) classifying user applications that access a local storage device as high priority and low priority, the high priority user applications being those whose local storage device access is being monitored, and the low priority user applications being those that can run in the background;
   (b) monitoring use of the local storage device by high priority applications;
   (c) calculating a fraction of the time that the high priority applications access the local storage device; and
   (d) regulating access to the local storage device of a low priority user application based on the fraction, wherein the access activity of the low priority user application is suspended when the high priority applications access the storage above a predetermined fraction of the time.

19. The method of claim 18, wherein the low priority user software applications include any of backup system user applications, security system user software applications, anti-virus user applications, archive systems, compression user applications and an application that monitors the local storage device access.

20. A method of local storage device load management, the method comprising:
   (a) monitoring, by intercepting system calls to the local storage device, use of the local storage device by high priority user applications, the high priority user applications being those whose local storage device access is being monitored; and
   (b) calculating a load on the local storage device from accesses of the local storage device by the high priority user applications; and
   (c) suspending access to the local storage device of an anti-virus application based on the calculated load when the high priority user applications access the storage above a predetermined load, the high priority user applications being those that require substantial user interaction.

21. A computer usable storage medium having computer program logic stored thereon, the computer program logic used for executing on a processor for local storage device load management, the computer program logic comprising:
   (a) computer program code means for classifying user applications that access a local storage device as high priority and low priority, the high priority user applications being those whose local storage device access is being monitored, and the low priority user applications being those that can run in the background;
   (b) computer program code means for monitoring use of the local storage device by high priority user applications;
   (c) computer program code means for calculating a fraction of the time that the high priority user applications access the local storage device; and
   (d) computer program code means for regulating access to the local storage device of a low priority user application based on the fraction, wherein the access activity of the low priority user application is suspended when the high priority user applications access the storage above a predetermined fraction of the time.

* * * * *